US010288250B2

(12) United States Patent
Rabek et al.

(10) Patent No.: US 10,288,250 B2
(45) Date of Patent: May 14, 2019

(54) LAMP FOR A MOTOR VEHICLE BODY

(71) Applicant: Dr. Ing. h.c. F. Porsche Aktiengesellschaft, Stuttgart (DE)

(72) Inventors: Alexander Rabek, Calw (DE); Heinz Redlich, Ludwigsburg (DE); Malte Moessner, Stuttgart (DE); Ulrich Bauer, Gerlingen (DE); Burkhard Leutiger, Pforzheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/820,466

(22) Filed: Nov. 22, 2017

(65) Prior Publication Data
US 2018/0172232 A1 Jun. 21, 2018

(30) Foreign Application Priority Data

Dec. 19, 2016 (DE) .......................... 10 2016 124 748

(51) Int. Cl.
| | |
|---|---|
| B60Q 1/30 | (2006.01) |
| F21S 43/14 | (2018.01) |
| F21S 43/20 | (2018.01) |
| F21S 43/31 | (2018.01) |
| F21S 43/40 | (2018.01) |
| F21S 45/10 | (2018.01) |

(52) U.S. Cl.
CPC ................ *F21S 43/31* (2018.01); *B60Q 1/30* (2013.01); *F21S 43/14* (2018.01); *F21S 43/26* (2018.01); *F21S 43/40* (2018.01); *F21S 45/10* (2018.01)

(58) Field of Classification Search
None
See application file for complete search history.

(56) References Cited

U.S. PATENT DOCUMENTS

| | | | |
|---|---|---|---|
| 6,045,245 A | 4/2000 | Kanou | |
| 6,224,246 B1 | 5/2001 | Natsume et al. | |
| 2002/0085390 A1 | 7/2002 | Kiyomoto et al. | |
| 2003/0193815 A1 | 10/2003 | Mishimagi | |
| 2007/0195540 A1* | 8/2007 | Misawa | B60Q 1/2607 362/459 |

FOREIGN PATENT DOCUMENTS

| | | |
|---|---|---|
| EP | 1411291 B1 | 4/2011 |
| JP | S 62121383 A | 6/1987 |
| JP | H 08306208 A | 11/1996 |
| JP | 2004265697 A | 9/2004 |
| JP | 2008146879 A | 6/2008 |
| JP | 2010225557 A | 10/2010 |

* cited by examiner

*Primary Examiner* — Kristy A Haupt
(74) *Attorney, Agent, or Firm* — Leydig, Voit & Mayer, Ltd.

(57) ABSTRACT

A lamp for a motor vehicle body includes a light source configured to generate light beams; a reflector configured to deflect and reflect the light beams; and an optical plate configured to scatter reflected light beams and non-reflected light beams. The reflector includes a first partial region and a second partial region for generating different brightness levels. The first partial region of the reflector is configured to be reflection-free.

20 Claims, 2 Drawing Sheets

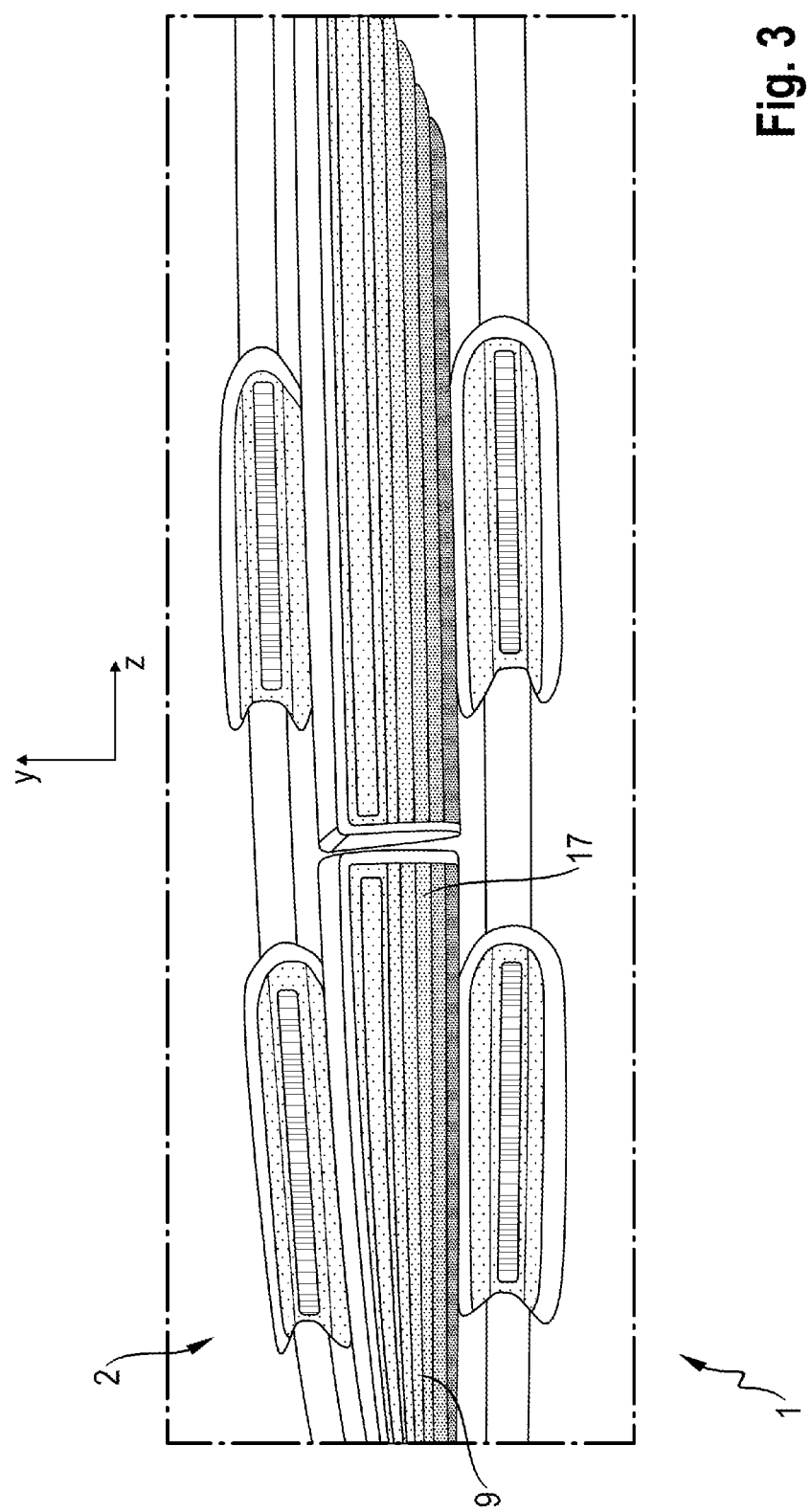

LAMP FOR A MOTOR VEHICLE BODY

CROSS REFERENCE TO RELATED APPLICATIONS

This application claims benefit to German Patent Application No. DE 10 2016 124 748.0, filed Dec. 19, 2016, which is hereby incorporated by reference herein.

FIELD

The invention relates to a lamp for a motor vehicle body, having a light source and a reflector.

BACKGROUND

U.S. Pat. Nos. 6,224,246 and 6,045,245 both disclose a lamp of a motor vehicle body that has a reflector having a structured surface in order to increase the light intensity of the lamp, wherein the structure is in the form of elevations. In the region of the elevations, increased reflection occurs due to these elevations, by way of which different light regions can be implemented.

SUMMARY

In an embodiment, the present invention provides a lamp for a motor vehicle body. The lamp includes a light source configured to generate light beams; a reflector configured to deflect and reflect the light beams; and an optical plate configured to scatter reflected light beams and non-reflected light beams. The reflector includes a first partial region and a second partial region for generating different brightness levels. The first partial region of the reflector is configured to be reflection-free.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows a front view of the lamp according to FIG. 2.

DETAILED DESCRIPTION

Embodiments of the present invention to provide an alternative lamp for a motor vehicle body.

A lamp according to an embodiment of the invention for a motor vehicle body comprises a light source for generating light beams, a reflector for deflecting and reflecting the light beams, and an optical plate for scattering reflection beams and non-reflected light beams. The reflector has a first partial region and a second partial region to generate different brightness levels, wherein the first partial region of the reflector is configured to be reflection-free. In this context, reflection-free is understood to mean that this partial region does not reflect the light beams, because they are either for example completely absorbed or not incident on this partial region, for example because the partial region is not able to be irradiated or is not irradiated, i.e. is obscured. The advantage of this reflection-free partial region is the bringing about of different brightness levels of the lamp.

The first partial region advantageously has a greater distance from the light source than the second partial region. As a result, it is already possible to attain for example at least partial covering of the first partial region by way of the second partial region, for example by the second partial region extending, as viewed in cross-section and starting from the light source, at least partially over the first partial region.

In a further configuration of a lamp according to an embodiment of the invention, a beam-transmissive wall is formed between the first partial region and the second partial region. The advantage of the beam-transmissive wall should be considered that the bringing about of the different brightness levels of the lamp can be enhanced, in particular if the wall is provided with structures. A corresponding structure can be used to guide the light beams which are incident on the wall onto the optical plate in a manner such that an enhancement of or a reduction in the brightness differences of the lamp which are produced on the basis of the reflection-free partial region takes place.

In a further configuration of a lamp according to an embodiment the invention, a curvature of the reflector is discontinuous such that a shoulder is formed between the first partial region and the second partial region, wherein a third partial region of the first partial region is configured such that it is covered by the shoulder in the direction of the light beams. A region, the third partial region of the reflector, which is reliably not irradiated, is provided by way of the shoulder.

The optical plate is arranged between a light plate and the reflector to protect it against contamination and/or to protect the reflector against contamination and/or to protect against ingress of moisture or humidity in a space between the reflector and the optical plate.

Figure 1:
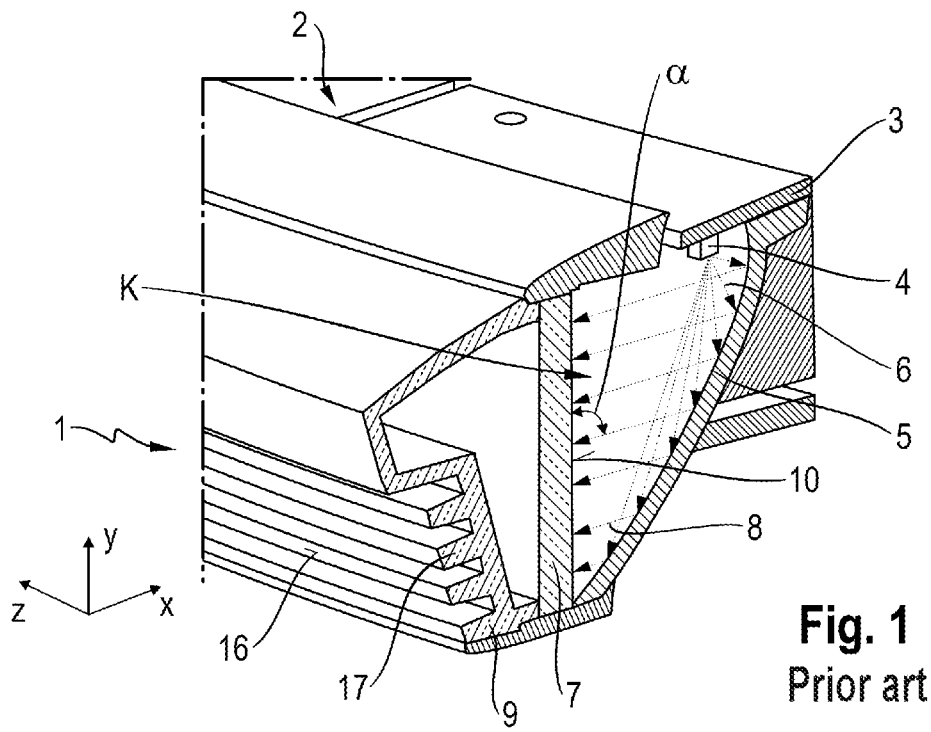
FIG. 1 shows a perspective cross-section illustration of a lamp for a motor vehicle body according to the prior art.

A lamp 1, configured according to the prior art, for a motor vehicle body 2 is configured according to FIG. 1. The lamp 1 comprises a holder 3 for holding a light source 4, a reflector 5 for deflecting and reflecting light beams 6 from the light source 4, an optical plate 7 for scattering the reflected light beams, referred to below as reflection beams 8, and non-reflected light beams 6, and a light plate 9 for protecting in particular the optical plate 7 against contamination and damage. This light plate 9 is preferably formed in one piece and protects the interior of the lamp 1 against weather influences, in particular against the ingress of rainwater, dust and moisture. It is preferably configured to be clear as glass and colorless-transparent, but can also have optical means which are provided in integrated fashion therein, such as lenses, roughened regions and prisms and also a coloring, depending on the application requirements, for example a red coloring as a tail lamp. As is known, it also furthermore serves for design purposes.

The optical plate 7 is arranged between the light plate 9 and the reflector 5, in each case at a distance therefrom. It has corresponding structures, for example in the form of prisms, for scattering the light from the light source 4. However, it could also have structures that deviate from the prism shape and/or be colored.

The reflector 5 is curved in the manner of a bowl, generally parabolic, for deflecting or steering the light beams 6. A profile of the curvature K of the reflector 5 is configured to be continuous.

The reflector 5 is used to deflect the light beams 6 such that their angles of incidence $\alpha$ on the optical plate 7 are identical over a plate surface 10 that is configured such that it faces the reflector 5. Consequently, an intensity of the beams passing through the optical plate 7, which intensity is produced over this plate surface 10, is likewise identical. That means, the illumination from the lamp 1 is the same everywhere.

Figure 2:
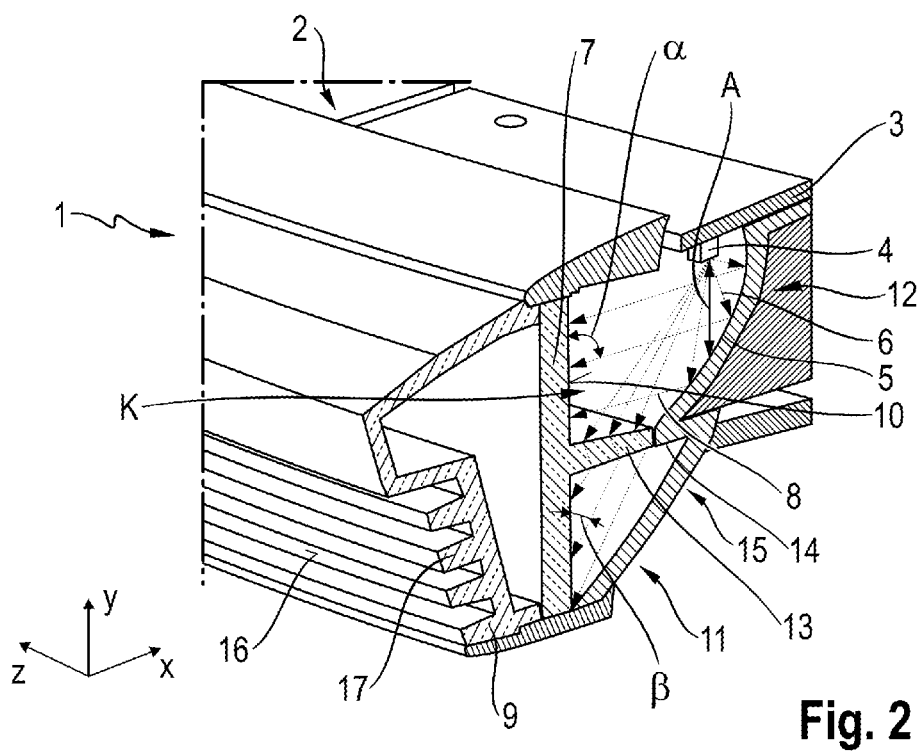
FIG. 2 shows a perspective cross-section illustration of a lamp for a motor vehicle body according to an embodiment of the invention.

For generating different intensities of the light source 4, the lamp 1 according to an embodiment of the invention, which is configured in accordance with FIG. 2, has the reflector 5 having a first partial region 11 and a second partial region 12, wherein the first partial region 11 is configured to be reflection-free. In other words, no beams are reflected over the first partial region 11. This could also be achieved for example by way of the first partial region 11 being configured to completely absorb the beams 6.

In the exemplary embodiment illustrated, the first partial region 11 of the reflector 5 is not able to be irradiated. In other words, configured to be irradiation-free. The first partial region 11 is not accessible to the light beams 6, in other words the light beams 6 do not strike the first partial region 11. To this end, the reflection-free first partial region 11 of the reflector 5 in the illustrated exemplary embodiment preferably has a greater distance A from the light source 4 than the reflective second partial region 12 of the reflector 5.

Arranged between the first partial region 11 and the second partial region 12 is a beam-transmissive wall 13. The wall 13 has a refractive index that is dependent on the application requirements, with the result that the light beams 6 that are incident on the wall 13 strike the optical plate 7 at a specific further angle of incidence $\beta$. In other words, the wall 13 is configured to be provided with structures. To this end, a surface of the wall 13 that is associated with the first partial region 11 and/or the second partial region 12, and/or the wall 13, can have a specific structure on the inside so that the further angle of incidence $\beta$ can be formed.

The wall 13 is arranged to be orthogonal with respect to the optical plate 7. In other words, the wall 13 is configured such that it extends at an angle of 90° starting from the plate surface 10 in the direction of the reflector 5.

The curvature K of the reflector 5 of the lamp 1 according to the invention is discontinuous, wherein the discontinuity of the curvature K is formed by way of a shoulder 14 which is formed between the first partial region 11 and the second partial region 12. A third partial region 15 of the first partial region 11 is configured to be covered by the shoulder 14 in the direction of the light beams 6 such that this third partial region 15 is not irradiated by the light beams 6 from the light source 4.

The light plate 9 has, on its light plate surface 16, which is formed such that it faces away from the optical plate 7, webs 17, which are configured such that they extend in the direction of a transverse vehicle axis z, and consequently in the direction of a width of the motor vehicle body 2. The motor vehicle body 2 is configured such that its length extends in the direction of the longitudinal vehicle axis x, and the motor vehicle body 2 is configured such that its height extends in the direction of the vehicle height axis y.

FIG. 3 illustrates the lamp 1 according to an embodiment of the invention in the form of a tail lamp of the motor vehicle body 2. The partial regions 11, 12, which have different angles of incidence $\alpha$, $\beta$, are used to produce regions of different brightness. An additional optical effect is brought about by way of the webs 17, which are used to optically represent stripes, in the present exemplary embodiment transverse stripes or horizontal stripes. The webs 17 could alternatively be arranged vertically, such that vertical stripes are optically represented.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A lamp for a motor vehicle body, the lamp comprising:
   a light source configured to generate light beams;
   a reflector including a first partial region and a second partial region for generating different brightness levels, wherein the first partial region is configured to not reflect the light beams generated by the light source and the second partial region is configured to reflect a portion of the light beams generated by the light source; and
   an optical plate disposed at a distance from the reflector and configured to scatter light beams reflected by the second partial region and to scatter non-reflected light beams.

2. The lamp as claimed in claim 1, wherein the first partial region is configured to be irradiation-free.

3. The lamp as claimed in claim 1, wherein the first partial region of the reflector has a greater distance from the light source than the reflective second partial region of the reflector.

4. The lamp as claimed in claim 1, wherein a beam-transmissive wall is formed between the first partial region and the second partial region.

5. The lamp as claimed in claim 4, wherein the wall is configured to be provided with structures.

6. The lamp as claimed in claim 4, wherein the beam-transmissive wall is disposed between the light source and the optical plate in an optical path of the non-reflected light beams scattered by the optical plate.

7. The lamp as claimed in claim 6, wherein the beam-transmissive wall is not disposed between the second partial region and the optical plate in an optical path of the light beams reflected by the second partial region.

8. The lamp as claimed in claim 1, wherein a curvature of the reflector is discontinuous such that a shoulder is formed between the first partial region and the second partial region, wherein a third partial region of the first partial region is configured to be covered by the shoulder in the direction of the light beams.

9. The lamp as claimed in claim 1, further comprising an exterior light plate, wherein the optical plate is arranged between the exterior light plate and the reflector and at a distance from the exterior light plate.

10. The lamp as claimed in claim 1, wherein the lamp is configured in the form of a tail lamp.

11. A lamp for a motor vehicle body, the lamp comprising:
   a light source configured to generate light rays, wherein the light rays originate at the light source;
   a reflector including a first partial region and a second partial region, wherein the first partial region is configured to not reflect the light rays originating at the light source, and wherein the second partial region is configured to reflect a second portion of the light rays originating at the light source so as to produce second partial region reflected light rays; and
   an optical plate disposed at a distance from the reflector and configured to scatter the second partial region reflected light rays and to scatter a first portion of the light rays originating the light source.

12. The lamp as claimed in claim 11, wherein an optically transmissive wall is disposed between the light source and the optical plate in an optical path of each of the light rays of the first portion of the light rays originating at the light source.

13. The lamp as claimed in claim 12, wherein the optically transmissive wall has a refractive index such that each of the light rays of the first portion of the light rays originating at the light source strikes the optical plate with an angle of incidence.

14. The lamp as claimed in claim 12, wherein the optically transmissive wall is arranged to be orthogonal to the optical plate.

15. The lamp as claimed in claim 11, wherein the first partial region is configured to not reflect the light rays originating at the light source by being configured to absorb incident light rays and/or by being obscured from direct optical paths originating at the light source.

16. The lamp as claimed in claim 15, wherein the first partial region is configured to not reflect the light rays originating at the light source by being obscured from the light source along direct optical paths originating at the light source by the second partial region.

17. The lamp as claimed in claim 11, wherein the first partial region of the reflector has a greater distance from the light source than the reflective second partial region of the reflector.

18. The lamp as claimed in claim 11, wherein the reflector has a curvature, the curvature being discontinuous such that a shoulder is formed between the first partial region and the second partial region, the first partial is obscured from the light source along direct optical paths originating at the light source by the shoulder.

19. The lamp as claimed in claim 11, wherein the lamp is configured in the form of a tail lamp.

20. The lamps as claimed in claim 11, wherein the second partial region has a curvature such that the second partial regions is configured to reflect each of the light rays of the second portion of the light rays originating at the light source such that each of the second partial region reflected light rays has a common angle of incidence with respect to the optical plate.

* * * * *